Sept. 15, 1970 HARUMI MIYAGI 3,529,116
HEATING ROTARY DRUM APPARATUS HAVING SHAPED FLUX PATTERN
Original Filed Nov. 22, 1965 2 Sheets-Sheet 1

INVENTOR
HARUMI MIYAGI
BY Orland M. Christensen
ATTORNEY

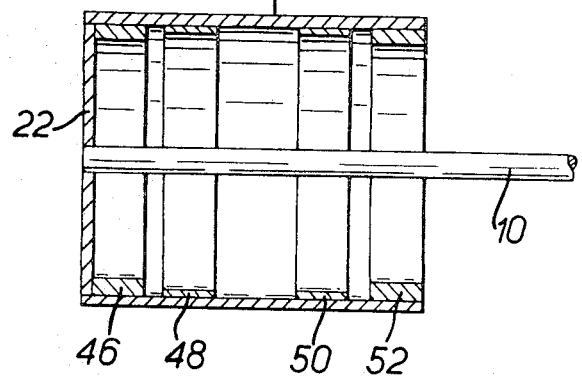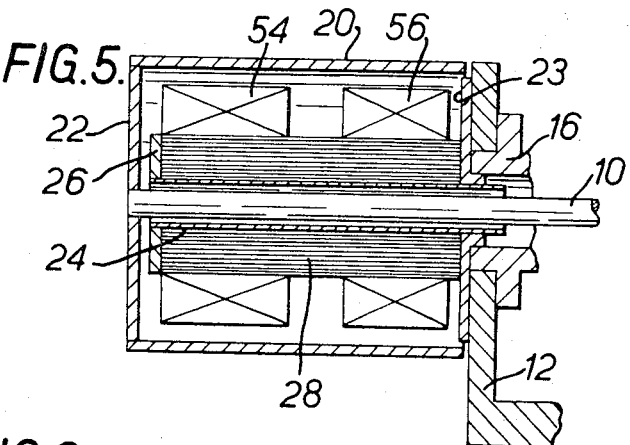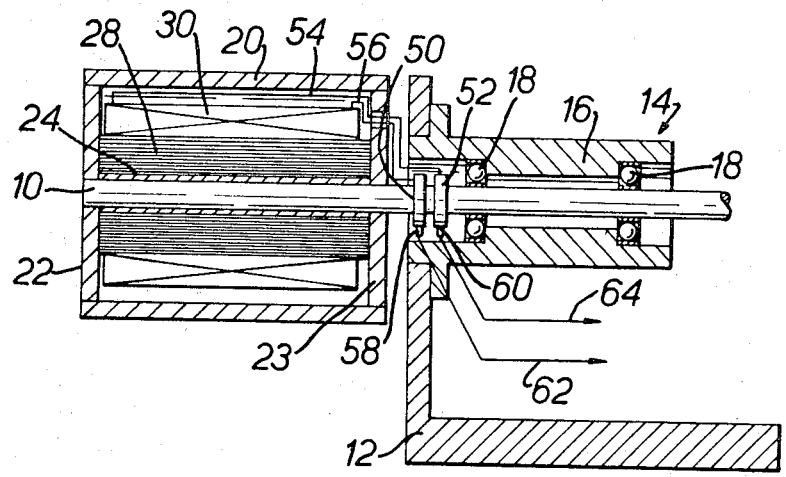

United States Patent Office 3,529,116
Patented Sept. 15, 1970

3,529,116
HEATING ROTARY DRUM APPARATUS HAVING SHAPED FLUX PATTERN
Harumi Miyagi, Kyoto, Japan, assignor to Tokushu Denki Kabushikikaisha, a corporation of Japan
Original application Nov. 22, 1965, Ser. No. 509,004, now Patent No. 3,412,228, dated Nov. 19, 1968. Divided and this application Aug. 13, 1968, Ser. No. 755,494
Claims priority, application Japan, Nov. 21, 1964, 39/66,111; Jan 20, 1965, 40/2,953
Int. Cl. H05b 5/00, 9/02
U.S. Cl. 219—10.61
2 Claims

ABSTRACT OF THE DISCLOSURE

A rotary drum apparatus for use in heating purposes is disclosed herein which is heated inductively by means for developing magnetic flux in a predetermined field pattern along the length of the drum so that flux density is greater and produces more heat at predetermined locations along the drum than at others.

---

This application is a division of Ser. No. 509,004, filed Nov. 22, 1965 by the same inventor, and entitled "Heating Rotary Drum Apparatus."

BACKGROUND AND SUMMARY OF THE INVENTION

This invention relates to an apparatus provided with a rotary drum for use in heating a fiber, filament, tape or the like as it passed around the drum surface.

In the process of manufacturing or treating synthetic fibers; for example, it is often required to apply heat to the fibers as they are being run. In the prior art a roller or drum enclosing an electrical resistance wire such as Nichrome wire has been in wide use. With such a drum, since the heat produced by the resistance wire is transferred to the drum surface by radiation, a great loss in the amount of heat transferred from the wire to the drum is caused. Moreover, as the drum is rotated, a centrifugal force is always being applied to the wire often to break it, with a resulting reduction in the processing efficiency and a considerable loss in time due to stoppage of the running of the apparatus for repair or replacement of the broken wire.

In the aforementioned parent application Ser. No. 509,004 an improvement in heating rotary drums is disclosed and claimed which provides specially shaped or positioned low-reluctance flux paths or conductors on the internal surface of the drum in order to concentrate induced heat in certain regions to obtain a desired heat profile along the drum. It is the primary object of the invention disclosed in this and said parent application and claimed herein to achieve similar heat profile results by providing means for shaping the magnetic flux field pattern itself.

Another object of the invention is to provide an apparatus as aforesaid having a rotary drum which is heated by a current electromagnetically induced in a closed circuit composed of the drum wall and eddy currents also electromagnetically induced in the drum wall.

Another object of the invention is to provide an apparatus as aforesaid which includes a rotary drum heated by electric currents electromagnetically induced in such a manner that the temperature of the circumferential wall of the drum is kept substantially uniform all over.

Other objects, features and advantages of the invention will become more apparent during the course of the specification.

Briefly stated, the apparatus in accordance with one embodiment of the invention comprises a shaft having a portion thereof rotatably received in bearing means and rotated by a suitable drive means, and a drum mounted on the shaft for rotation therewith. Within the drum there is provided one or more iron cores encircling the shaft, with a coil wound on each core and energized by an alternating current source. Upon energization of the coil, an alternating flux is generated in a predetermined pattern generally passing from one end of the core through the drum wall axially thereof to return to the opposite end of the core. Since a closed circuit is formed in the drum wall circumferentially thereof and in a plane normal to the axis of the rotating shaft, the circuit links with the alternating flux, with resulting electromagnetic induction of a current through the closed circuit. On the other hand, since the magnetic flux passes through the drum wall axially thereof, eddy currents are induced therein. Due to the circumferential current and the eddy currents Joule's heat is produced to heat the drum wall, which may be utilized for heating purposes.

The invention will be better understood from the following detailed description of preferred embodiments thereof with reference to the accompanying drawings, wherein:

FIGS. 2 through 4 are similar to FIG. 1 but showing other forms of heating rotary drums to which the aforementioned parent application is directed, with FIGS. 3 and 4 showing the drum and its mounting shaft only; and FIG. 5 is a similar view of the preferred form of this invention; and FIG. 6 is a similar view of a rotary heating drum having a different form of mounting the core within the drum.

Figure 1:
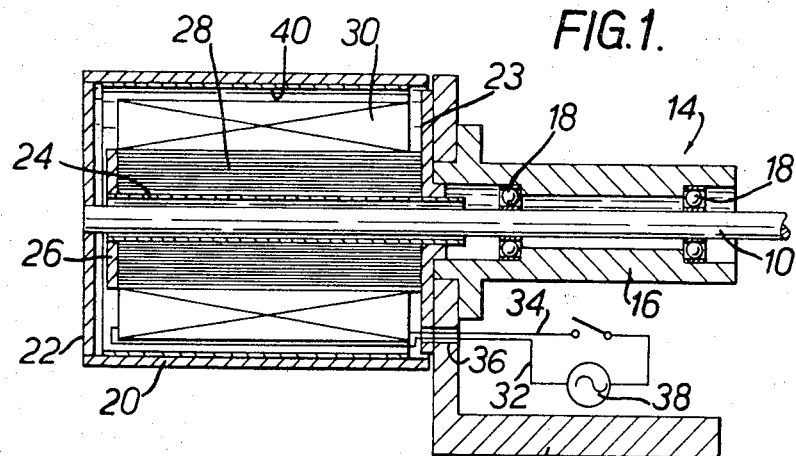
FIG. 1 is a schematic elevational view, in longitudinal section, of a rotary heating drum of the general type improved upon by this invention.

Now referring in detail to the drawings, there is shown in FIG. 1 a shaft 10 adapted to be rotated in one direction by a suitable drive means such as an electric motor, not shown. A fixed base 12 supports a bearing means 14 which comprises a hollow cylindrical member 16 of a suitable length fixed to the base 12. In the cylindrical member 16 there are a plurality of ball bearings 18 axially spaced apart, in which the shaft 10 is received. A hollow roller or drum 20 made of a suitable magnetic material such as, for example, cast iron has its one end being open and the opposite end closed by an end plate or disc 22 of a magnetic material. The shaft 10 has its outer end rigidly secured to the center of the disc 22 for simultaneous rotation of the shaft and the drum.

As will be described hereinafter, since a part of the base 12 forms a part of the magnetic path through which alternating flux is to pass, the base 12 must be made of a magnetic material, with its portion being arranged adjacent the open end of the drum 20 as if to close that open end. Otherwise, a disc 23 of a magnetic material is disposed adjacent the open end of the drum 20, as shown in FIG. 1.

Inside the drum 20 and mounted concentrically therewith there is provided a support tube 24 through which the rotatable shaft 10 loosely passes. The tube 24 has its one end rigidly fixed to the base 12 or the disc 23 and the opposite outer end provided with an end disc 26. An iron core 28 encircles the support tube 24, extending between the two opposite discs 23 and 26. Preferably, the core 28 is made of a silicon steel plate rolled in many layers around the tube 24 so that the core is circular in transverse section. Since the core 28 links with the magnetic flux produced, as will be described later, an electric current would flow circumferentially of the core so that the core would also be heated by Joule heat. To reduce Joule heat, a radial groove or slit, not shown, may advantageously be formed in the core along the whole length thereof and filled up with an electrical insulating material so as to break the closed circuit which would otherwise be completed in the core to link with the alternating flux.

A coil 30 is wound on the core 28 and is connected to an alternating current source 38 by a pair of leads 32 and 34 passing through a hole 36 formed in the disc 23 and the wall of the base 12.

Upon energization of this coil 30 by an alternating current from the source 38, there is developed in the core 28 an alternating magnetic flux, which is emitted from one end, say, the left-hand end of the core 28 and passes radially outwardly through the end plate 22 of the drum, then axially through the circumferential wall thereof and then radially inwardly through the opposite plate 23 and finally reaches the opposite end of the core 28 to enter thereinto. Through this magnetic path the flux alternates.

Since the flux passes through the circumferential wall of the drum axially thereof, the flux and the drum wall 20 link with each other, so that a current is induced in the drum wall in a plane normal to the axis of the drum. In other words, a current flows in the drum wall circumferentially thereof. This is apparent from the well known principle of operation of a transformer. Suppose that the coil 30 be the primary winding of a transformer. The circumferential wall of the drum 20 will be the secondary winding consisting of a single closed turn placed concentrically with the primary winding. Therefore, electromagnetic induction causes electric current to flow through the drum wall circumferentially thereof. This current may be referred to as a short-circuit current since it flows in the closed circuit composed of the circumferential wall of the drum.

On the other hand, as the alternating flux passes through the drum wall axially thereof, the electromagnetic induction also causes eddy currents to be produced in the drum wall. Due to the short-circuit current and eddy currents Joule heat is produced to heat the drum 20. Upon rotation of the shaft 10 the drum 20 is rotated while being heated. As a fiber or filament, not shown, is passed around the heated drum wall 20 in a few turns, it becomes heated as required in the process.

In FIG. 1, the circumferential wall of the drum 20 has its inner surface covered with a layer or sleeve 40 of a highly electrically conductive material. Metalizing the inner surface of the drum wall with copper will be a simple way of forming such an inner layer. The layer 40 then provides another closed circuit in parallel with the closed circuit provided by the drum wall. The combined impedance of the parallel closed circuits is lower than the impedance of the single closed circuit provided by the drum wall, with a resulting increase in the amount of short-circuit current and consequently Joule heat produced. With the same apparent power of the alternating current source 38, since a greater amount of short-circuit current flows with the presence of the inner layer 40 than without it, as mentioned just above, the power produced in the drum wall is increased with a resulting increase in the power-factor of load. This is another advantage resulting from the provision of the additional layer 40.

As previously described, the drum is heated by the short-circuit current and eddy currents produced by electromagnetic induction, and the short-circuit current is induced by the circumferential wall of the drum linking with the alternating flux. The flux, however, passes through the discs 22 and 23, so that a smaller number of magnetic flux lines link with the opposite end portions of the circumferential wall of the drum 20 than the other portions thereof. This means that a smaller amount of short-circuit current is induced in the areas of the drum wall toward the opposite ends thereof. Consequently, the temperature of the drum wall tends to become higher in the central area along the axis of the drum wall and lower toward the opposite end portions thereof. This certainly is undesirable in view of the heating purpose of the drum. Toward solving the problem and providing a substantially uniform temperature distribution in the drum wall, the arrangements of FIGS. 2 through 5 are directed.

Figure 2:
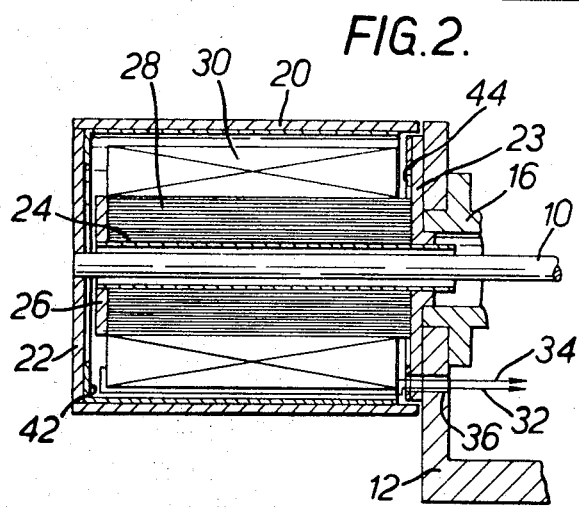

In FIG. 2, both the discs 22 and 23 have their respective inner surfaces covered by electrically conductive annular layers or rings 42 and 44 formed in the same manner as that of forming the layer 40. Then the alternating flux passing through the discs 22 and 23 will link with the conductive layers 42 and 44 and cause another short-circuit current to be induced to flow therethrough. Due to this current the layers 42 and 44 will be heated for the heat to be transferred to the opposite end portions of the circumferential wall of the drum so as to raise the temperature of these portions higher than it would be without the layers 42 and 44, thereby effecting a uniform temperature distribution over the whole area of the drum wall.

Figure 3:
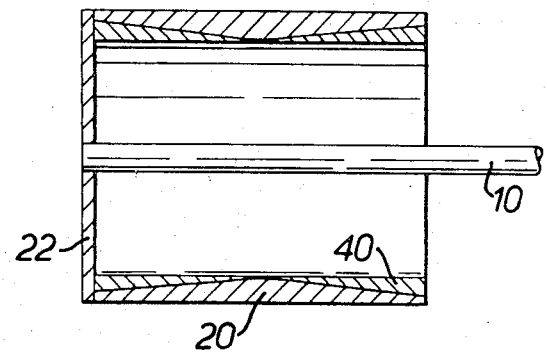

In order to induce a greater amount of short-circuit current near the opposite end portions of the drum wall than in the central portion thereof, the layer 40 may be made thicker toward the opposite ends thereof, as shown in FIG. 3. For the same purpose, the layer may be replaced by a plurality of electrically conductive rings 46, 48, 50 and 52 (FIG. 4) placed on the inner surface of the drum wall and equidistantly spaced apart along the axis thereof, with the rings 46, 52 positioned at the opposite ends being thicker than the other rings placed toward the center. It will be easily understood that a greater amount of short-circuit current is induced in the areas toward the opposite ends of the drum wall than the central area thereof because of a smaller resistance provided by the greater thickness of the opposite end portions of the layer 40 in FIG. 3 or of the rings 46 and 52. Thus, the temperature of the opposite end portions of the drum wall will be raised to that of the central area thereof, thereby accomplishing a uniform temperature distribution all over the drum wall.

In FIG. 5, a uniform temperature of the drum wall is effected in accordance with the invention by distributing leakage flux as evenly as possible. In the arrangement of FIG. 1, all the flux produced does not pass through the whole length of the iron core 20, but some flux pass through only a part of the iron core and leak out therefrom to pass through a part of the drum wall. It will be easily seen that there exists more leakage flux in the central portion of the length of the coil 30 than any other portions thereof and, consequently, the temperature of the drum wall tends to become higher toward the central portion of the length thereof. To avoid this, in FIG. 5 the single coil 30 of FIG. 1 is divided into a plurality, say, a pair of coils 54 and 56, which are positioned toward the opposite end portions of the iron core 28, with a resulting substantially uniform distribution or shape of the leakage flux. Thus the temperature of the drum wall can be kept at a substantially uniform level all over.

In FIGS. 1 through 5, the drum 20 is rotated while the iron core 28 with the coil or coils thereon is held stationary. If desired, the latter may also be rotated together with the former. FIG. 6 shows by way of example such an arrangement, wherein the support tube 24, iron core 20 and coil 30 are all rigidly fixed to the rotatable shaft 10 and also the disc 23 is rigidly fixed to the shaft 10 and the drum wall 20. A pair of slip rings 50 and 52 are connected to the coil 30 by leads 56 and 54, respectively, and rigidly mounted on the shaft 10 for rotation therewith. A pair of brushes 58 and 60 connected to an alternating current source by leads 62 and 64 are arranged in sliding contact with the rings 50 and 52, respectively, so that while the shaft 10 with the parts mounted thereon is being rotated, the coil 30 is energized without fail.

Having illustrated and described the preferred embodiment of the invention, it should be recognized that there are many other modifications and changes within the scope of the invention as defined in the appended claims.

What is claimed is:

1. A heating rotary drum apparatus for use in heating purposes comprising means for developing an alternating magnetic flux distributed in a predetermined field pattern such that the flux density in a plane normal to a central axis through the field is greater at two locations spaced apart along the axis than at locations therebetween, and a rotatable, electrically conductive, ferro-magnetic drum having a circumferential wall with an external surface of predetermined axial length adapted to be contacted by an article to be heated, said drum substantially enclosing and being magnetically coupled to said flux developing means and positioned relative thereto to provide a predetermined low-reluctance flux path, the central axis of said field and the axis of rotation of said drum being parallel so that more heat is generated by induced currents at locations of greater flux density whereby more heat is conducted to predetermined corresponding portions along the axial length of the external surface of said drum wall.

2. A heating rotary drum apparatus for use in heating purposes comprising: a shaft adapted to be rotated by a drive means; a drum arranged concentrically with said shaft and having a circumferential wall and an end disc, both formed of a magnetic material, said end disc closing one of the opposite end openings of said circumferential wall and being rigidly mounted at its center on said shaft for rotation of said drum with said shaft; a plate formed of a magnetic material and disposed adjacent the opposite end opening of said drum; an iron core enclosed and arranged within said drum concentrically with the axis of said shaft; and a plurality of coils wound on said iron core for connection to an alternating current source, two of said coils being positioned near the opposite end portions of said core along the length thereof with a space being provided between said two coils, whereby a substantially uniform flux distribution is provided.

References Cited

UNITED STATES PATENTS

| | | | |
|---|---|---|---|
| 2,452,197 | 9/1919 | Kennedy | 219—10.79 X |
| 2,273,423 | 2/1919 | Somes | 219—10.49 |
| 2,849,584 | 8/1919 | Tudbury | 219—10.79 X |
| 3,278,723 | 10/1919 | Van Toorn | 219—471 X |

JOSEPH V. TRUHE, Primary Examiner

L. H. BENDER, Assistant Examiner

U.S. Cl. X.R.

219—10.79